(12) United States Patent
Liu et al.

(10) Patent No.: US 12,023,628 B2
(45) Date of Patent: Jul. 2, 2024

(54) DRINKING WATER PURIFICATION SYSTEM WITH A BACKWASHABLE FILTER CARTRIDGE AND A NANOFILTRATION SYSTEM

(71) Applicant: Greentech Environment Co., Ltd., Beijing (CN)

(72) Inventors: Mu Liu, Beijing (CN); Xiaofeng Lin, Beijing (CN); Zehua Li, Beijing (CN); Yingqiang Su, Beijing (CN); Xiaohong Niu, Beijing (CN); Huiming Han, Beijing (CN); Xiaofang Zhang, Beijing (CN)

(73) Assignee: Greentech Environment Co., Ltd., Beijing (CN)

( * ) Notice: Subject to any disclaimer, the term of this patent is extended or adjusted under 35 U.S.C. 154(b) by 210 days.

(21) Appl. No.: 17/501,684

(22) Filed: Oct. 14, 2021

(65) Prior Publication Data
US 2022/0388866 A1 Dec. 8, 2022

Related U.S. Application Data

(63) Continuation of application No. PCT/CN2021/093334, filed on May 12, 2021.

(30) Foreign Application Priority Data

Jun. 10, 2020 (CN) .......................... 202010521051.4

(51) Int. Cl.
  *B01D 61/04* (2006.01)
  *B01D 61/02* (2006.01)
  (Continued)

(52) U.S. Cl.
  CPC .......... *B01D 61/04* (2013.01); *B01D 61/027* (2013.01); *B01D 65/02* (2013.01); *C02F 1/442* (2013.01);
  (Continued)

(58) Field of Classification Search
  None
  See application file for complete search history.

(56) References Cited

U.S. PATENT DOCUMENTS

| 6,120,688 A * | 9/2000 | Daly ....................... C02F 1/444 |
| | | 210/636 |
| 2014/0048483 A1* | 2/2014 | Maeda .................. B01D 65/02 |
| | | 210/636 |

(Continued)

FOREIGN PATENT DOCUMENTS

| CN | 201362626 Y | 12/2009 |
| CN | 201908008 U | 7/2011 |

(Continued)

OTHER PUBLICATIONS

Machine translation of WO-2012071815-A1, pp. 1-6. (Year: 2012).*
Abstract of CN-108502979-A, pp. 1-2. (Year: 2018).*

*Primary Examiner* — Clare M Perrin

(57) ABSTRACT

The present disclosure provides a drinking water purification system with a backwashable filter cartridge and a nanofiltration system. The drinking water purification system includes a backwashable pre-filtration unit, a nanofiltration unit and a cleaning unit. The backwashable pre-filtration unit is provided with a backwashable filter cartridge. The nanofiltration unit is provided with a nanofiltration filter cartridge. A water outflow side of the backwashable filter cartridge is connected to a water inflow side of the nanofiltration filter cartridge. The cleaning unit is connected to the water outflow side of the backwashable filter cartridge.

9 Claims, 3 Drawing Sheets

(51) Int. Cl.
    *B01D 65/02*        (2006.01)
    *C02F 1/44*          (2023.01)
    *C02F 9/00*          (2023.01)
    *B01D 65/08*        (2006.01)
    *C02F 1/00*          (2023.01)

(52) U.S. Cl.
    CPC ................ *C02F 9/00* (2013.01); *B01D 65/08* (2013.01); *C02F 1/001* (2013.01); *C02F 2209/03* (2013.01); *C02F 2209/05* (2013.01); *C02F 2303/16* (2013.01)

(56)             References Cited

U.S. PATENT DOCUMENTS

2014/0124441 A1*   5/2014   Ikeda .................... B01D 65/02
                                                                 210/636
2021/0230017 A1*   7/2021   Crouch ................. B01D 61/12

FOREIGN PATENT DOCUMENTS

| CN | 202717661 | U | | 2/2013 | |
|----|-----------|---|---|--------|---|
| CN | 104386873 | A | | 3/2015 | |
| CN | 108502979 | A | * | 9/2018 | ........... B01D 61/027 |
| CN | 111646545 | A | | 9/2020 | |
| KR | 20020062213 | A | | 7/2002 | |
| WO | WO-2012071815 | A1 | * | 6/2012 | ............ B01D 61/18 |

\* cited by examiner

DRINKING WATER PURIFICATION SYSTEM WITH A BACKWASHABLE FILTER CARTRIDGE AND A NANOFILTRATION SYSTEM

CROSS-REFERENCE TO RELATED APPLICATIONS

This application is a continuation of International Patent Application No. PCT/CN2021/093334, filed on May 12, 2021, which claims the benefit of priority from Chinese Patent Application No. 202010521051.4, filed on Jun. 10, 2020. The content of the aforementioned applications, including any intervening amendments thereto, is incorporated herein by reference in its entirety.

TECHNICAL FIELD

The present application relates to drinking water purification, and more particularly to a drinking water purification system with a backwashable filter cartridge and a nanofiltration system.

BACKGROUND

As national water quality standards become more and more strict, and the drinking water quality are gradually demanding, the conventional drinking water treatment of coagulation-sedimentation-filtration-disinfection fails to produce water that meets the new water quality standards. Some advanced treatment processes such as ozone-biological activated carbon process, membrane separation and photocatalytic oxidation are adopted to improve the water quality. Particularly, nanofiltration membrane treatment, for the stable water quality, has attracted lot of attention.

Nanofiltration membrane can intercept organic pollutants with small and medium molecular weight in drinking water to protect human health. In addition, the nanofiltration membrane can reduce the concentration of calcium and magnesium ions in hard drinking water, and remove sulfate, fluorine and chloride ions. Meanwhile, the nanofiltration membrane can selectively allow the sodium ion, potassium ion and other trace elements to permeate and retain beneficial elements. However, the nanofiltration membrane is prone to be polluted when in use. The fluctuation of the water quality in the conventional drinking water treatment may cause the pollution of the nanofiltration membrane. Therefore, before entering the nanofiltration membrane, insoluble substances in the raw water should be removed as much as possible. Generally, a security filter is arranged at a front end of a nanofiltration system to carry out a pretreatment. Moreover, multi-stage membrane filtration, such as microfiltration-nanofiltration and ultrafiltration-nanofiltration, can also be adopted for the pretreatment. Nevertheless, the security filter has a limited ability to intercept pollutants and requires frequent replacement of the filter cartridge, which not only increases the workload of the operator, but also cannot satisfy the automation requirements. Whereas the microfiltration and ultrafiltration pretreatment have high operation and maintenance cost. How to protect the nanofiltration membrane from being polluted and enable the drinking water advanced treatment has become a technical challenge for those skilled in the art.

SUMMARY

To solve the technical problems mentioned above, the present disclosure provides a drinking water purification system with a backwashable filter cartridge and a nanofiltration system.

A drinking water purification system, comprising:
a backwashable pre-filtration unit;
a nanofiltration unit; and
a backwashing unit;
characterized in that the backwashable pre-filtration unit is provided with a backwashable filter cartridge; the nanofiltration unit is provided with a nanofiltration filter cartridge; a water outflow side of the backwashable filter cartridge is connected to a water inflow side of the nanofiltration filter cartridge; and the backwashing unit is connected to the water outflow side of the backwashable filter cartridge.

In some embodiments, the backwashable filter cartridge comprises a filter cylinder and a backwashable filter membrane; the filter cylinder is provided with a through hole; and the backwashable filter membrane is provided around an outer circumference of the filter cylinder in a pleated form.

In some embodiments, the nanofiltration filter cartridge comprises a filter cylinder and a nanofiltration membrane; the filter cylinder is provided with a through hole; and the nanofiltration membrane is provided around an outer circumference of the filter cylinder.

In some embodiments, the backwashable pre-filtration unit comprises a water tank, a water feed pump, an inlet electric valve, an inlet pressure gauge, a pressure tank and an outlet electric valve connected sequentially; the outlet electric valve is connected to the nanofiltration unit; and the backwashable filter cartridge is arranged in the pressure tank.

In some embodiments, the nanofiltration unit comprises a first water tank, a water feed pump, a booster pump, an inlet electric valve, an inlet electrical conductivity meter, an inlet pressure gauge, a pressure tank, an outlet electric valve, an outlet electrical conductivity meter, an outlet pressure gauge and a second water tank connected sequentially; the first water tank is connected to the backwashable pre-filtration unit; and the nanofiltration filter cartridge is arranged in the pressure tank.

In some embodiments, the backwashing unit comprises a water feed pump, an inlet electric valve, a first water inlet valve for backwashing and a second water inlet valve for forward washing; the inlet electric valve is connected to the water outflow side of the backwashable filter cartridge and a water inflow side of the backwashable filter cartridge via the first water inlet valve and the second water inlet valve, respectively; the backwashable pre-filtration unit is provided with a first drain valve and a second drain valve; the first drain valve and the second drain valve are connected to the water outflow side and the water inflow side of the backwashable filter cartridge; the inlet electric valve is connected to the water inflow side of the nanofiltration filter cartridge via a third water inlet valve for forward washing; and the nanofiltration unit is provided with a third drain valve connecting to the water inflow side of the nanofiltration filter cartridge.

In some embodiments, the backwashing unit further comprises an air compressor and an air inlet valve; and the air compressor is connected to the water inflow side of the backwashable filter cartridge or the water outflow side of the backwashable filter cartridge via the air inlet valve.

In some embodiments, the backwashing unit further comprises a chemical cleaning tank, a first chemical feed pump and a first chemical inlet valve connected sequentially; and the first chemical inlet valve is connected to the water outflow side of the backwashable filter cartridge or the water inflow side of the backwashable filter cartridge.

In some embodiments, the drinking water purification system further comprises a chemical cleaning unit; the chemical cleaning unit comprises a second chemical feed pump and a second chemical inlet valve; the second chemical feed pump and the second chemical inlet valve are sequentially connected to the chemical cleaning tank; and the second chemical inlet valve is connected to the water inflow side of the nanofiltration filter cartridge.

In some embodiments, the drinking water purification system further comprises a chemical feed unit; the chemical feed unit comprises a chemical feed tank, a chemical feed pump and a chemical inlet valve connected sequentially; and the chemical inlet valve is connected to the water inflow side of the nanofiltration filter cartridge.

Compared to the prior art, the drinking water purification system provided herein provide the backwashable pre-filtration unit before the water inflow side of the nanofiltration filter cartridge. The backwashable pre-filtration unit can preforms a prefiltration on raw water to filter out pollutants with large particle size and remove the insoluble substances in the raw water as much as possible, so as to avoid the pollution of the nanofiltration filter cartridge in the nanofiltration unit. In addition, the backwashable filter cartridge in the backwashable pre-filtration unit can be cleaned by the backwashing unit after being polluted. In this way, the performance of the backwashable pre-filtration unit is stable, and the maintenance and replacement cost of the backwashable filter cartridge and the nanofiltration filter cartridge is reduced. Meanwhile, the drinking water purification system can provide a stable effluent and high-quality water. Furthermore, pumps, valves and pressure gauges in the drinking water purification system are electrically connected to a PLC (programmable logic controller) control system, which realizes an automatic management and reduces labor cost.

BRIEF DESCRIPTION OF THE DRAWINGS

The accompanying drawings provided herein are incorporated into the description and constitute a part of the description, and disclose some embodiments of this disclosure, so as to explain the technical solutions of this present disclosure.

The technical solutions of the present disclosure and the prior art will be described more clearly below with reference to the accompany drawings. Obviously, other accompany drawings can be made by those skilled in the art without sparing creative work.

Figure 1:
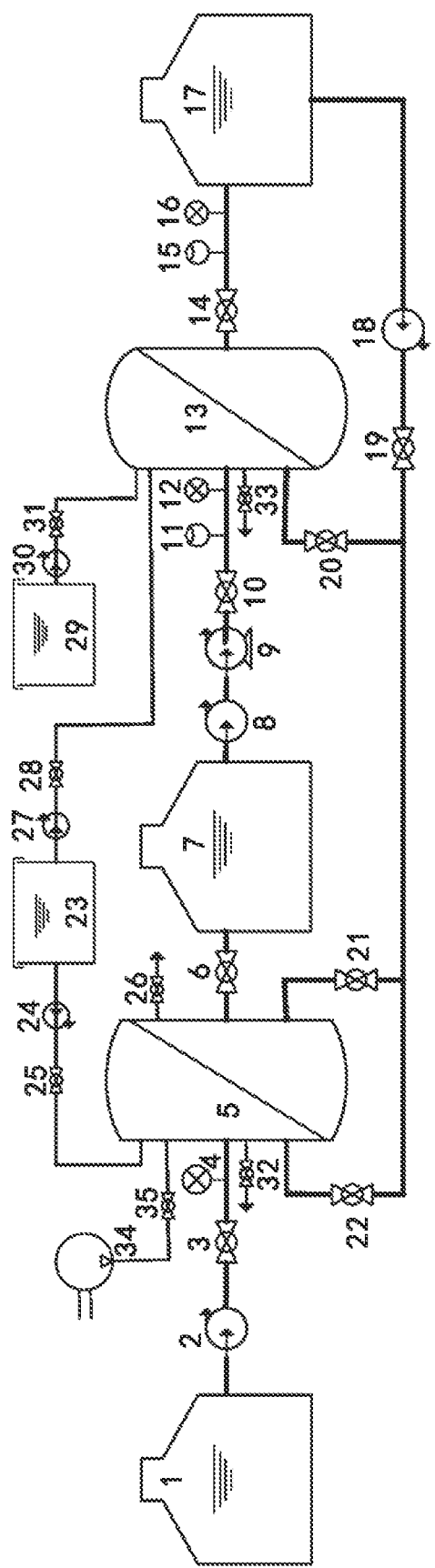
FIG. 1 schematically depicts a drinking water purification system in accordance with an embodiment of the present disclosure.

In the drawings, 1, water tank; 2, water feed pump; 3, inlet electric valve; 4, inlet pressure gauge; 5, pressure tank; 51, filter cylinder; 52, backwashable filter membrane; 6, outlet electric valve; 7, water tank; 8, water feed pump; 9, booster pump; 10, inlet electric valve; 11, inlet electrical conductivity meter; 12, inlet pressure gauge; 13, pressure tank; 131, filter cylinder; 132, nanofiltration membrane; 14, outlet electric valve; 15, outlet electrical conductivity meter; 16, outlet pressure gauge; 17, water tank; 18, water feed pump; 19, inlet electric valve; 20, third water inlet valve; 21, first water inlet valve; 22, second water inlet valve; 23, chemical cleaning tank; 24, first chemical feed pump; 25, first chemical inlet valve; 26, first drain valve; 27, second chemical feed pump; 28, second chemical inlet valve; 29, chemical feed tank; 30, chemical feed pump; 31, chemical inlet valve; 32, second drain valve; 33, third drain valve; 34, air compressor; and 35, air inlet valve.

DETAILED DESCRIPTION OF EMBODIMENTS

The embodiments of the present disclosure will be described to allow the objectives, technical solutions and beneficial effects of this disclosure to be better understand. It should be noted that technical solutions of the embodiments can be combined if there is no conflict.

The embodiments provided herein are illustrative, and not intended to limit the present disclosure. Obviously, the embodiments provided herein are part of the embodiments, and other embodiments can be made without departing from the spirit of the present disclosure.

As shown in FIG. 1, the present disclosure provides a drinking water purification system, which includes a backwashable pre-filtration unit, a nanofiltration unit and a backwashing unit. The backwashable pre-filtration unit is provided with a backwashable filter cartridge. The nanofiltration unit is provided with a nanofiltration filter cartridge. A water outflow side of the backwashable filter cartridge is connected to a water inflow side of the nanofiltration filter cartridge. The backwashing unit is connected to the water outflow side of the backwashable filter cartridge.

Compared to the prior art, the drinking water purification system provided herein provide the backwashable pre-filtration unit before the water inflow side of the nanofiltration filter cartridge. The backwashable pre-filtration unit can preforms a prefiltration on raw water to filter out pollutants with large particle size and remove the insoluble substances in the raw water as much as possible, so as to avoid the pollution of the nanofiltration filter cartridge in the nanofiltration unit. In addition, the backwashable filter cartridge in the backwashable pre-filtration unit can be cleaned by the backwashing unit after being polluted. In this way, the performance of the backwashable pre-filtration unit is stable, and the maintenance and replacement cost of the backwashable filter cartridge and the nanofiltration filter cartridge is reduced. Meanwhile, the drinking water purification system can provide a stable effluent and high-quality water. Furthermore, pumps, valves and pressure gauges in the drinking water purification system are electrically connected to a PLC (programmable logic controller) control system, which realizes an automatic management and reduces labor cost.

Figure 2:
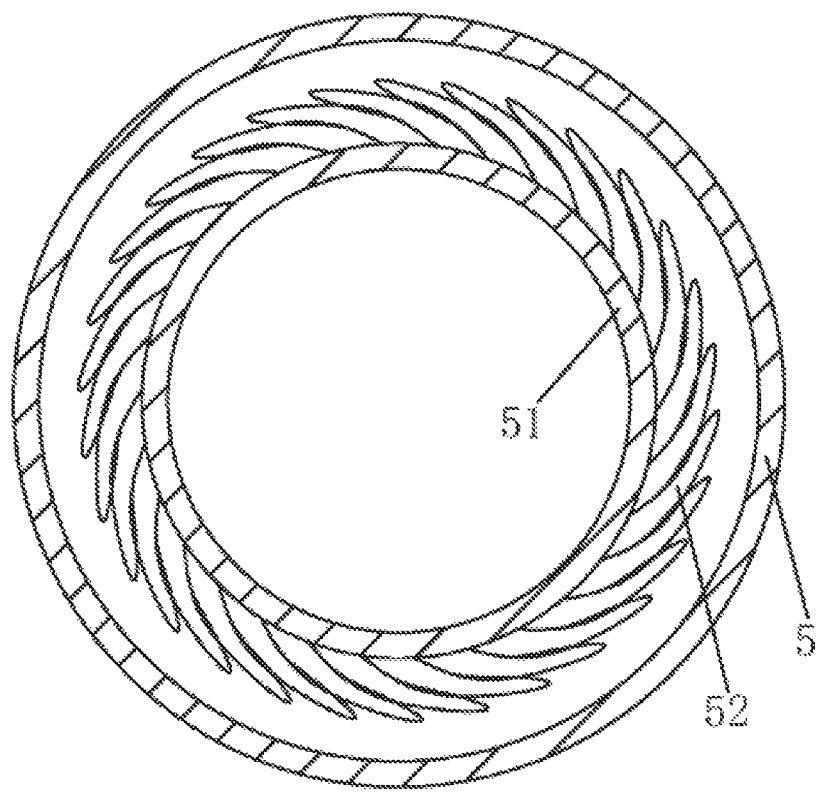
FIG. 2 is a schematic diagram of a backwashable filter cartridge.

In some embodiments, as shown in FIG. 2, the backwashable filter cartridge includes a filter cylinder 51 and a backwashable filter membrane 52. The filter cylinder 51 is provided with a through hole. The backwashable filter membrane 52 is provided around an outer circumference of the filter cylinder 51 in a pleated form. The filter cylinder 51 is cylindrical. An upper end and a lower end of the filter cylinder 51 may be provided with a cover plate. An inner side of the filter cylinder 51 is a water outflow side, and is connected to the nanofiltration unit via an outlet electric valve 6. The water outflow side of filter cylinder 51 is also connected to the backwashing unit to clean the backwashable filter membrane 52. The backwashable filter membrane 52 is arranged in a pleated shape, so as to increase an effective filtration area of the backwashable filter membrane 52. Each bent part of the backwashable filter membrane 52 is tangential to the filter cylinder 51, so as to ensure that a surface of the backwashable filter membrane 52 covers the outer circumference of the filter cylinder 51 and improve the filtering effect. The backwashable filter membrane 52 may be made of a high-purity polypropylene fiber. The backwashable filter membrane 52 has an absolute rating, and a pore size of the backwashable filter membrane 52 is no larger than 6 μm. The backwashable filter membrane 52 can reduce more than 95% of particles with a particle size larger than 1.5 μm, and reduce more than 99.9% of particles with a particle size larger than 6 μm in the raw water. Such backwashable filter membrane 52 can be used to carry out a pre-filtration and protect the nanofiltration filter cartridge from being polluted and blocked.

Figure 3:
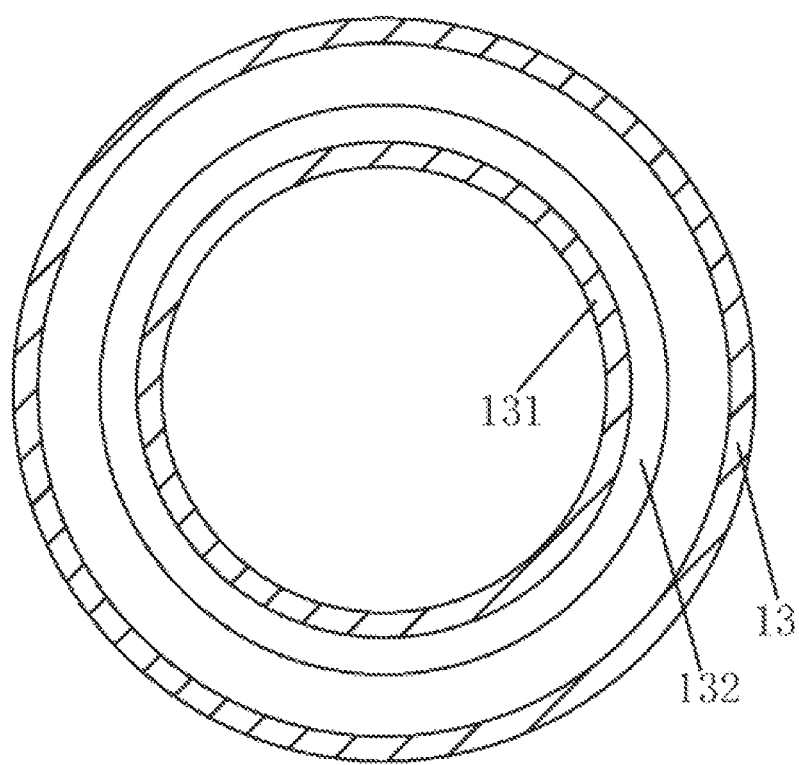
FIG. 3 is a schematic diagram of a nanofiltration filter cartridge.

In some embodiments, as shown in FIG. 3, the nanofiltration filter cartridge includes a filter cylinder 131 and a nanofiltration membrane 132. The filter cylinder 131 is provided with a through hole. The nanofiltration membrane 132 is provided around an outer circumference of the filter cylinder. The filter cylinder 131 is cylindrical, and an upper end and a lower end of the filter cylinder 131 may be provided with a cover plate. An inner side of the filter cylinder 131 is a water outflow side, and is connected to a water tank via an outlet electric valve 14. The nanofiltration membrane 132 may be made of aromatic polypiperazine, aromatic polyamide or a combination thereof, meeting the following indicators: removal rate of sulfate radical >90% (4-30° C.); removal rate of TOC (total organic carbon) >85% (4-30° C.); and color removal rate of >85% (4-30° C.).

In some embodiments, as shown in FIG. 1, the backwashable pre-filtration unit includes a water tank 1, a water feed pump 2, an inlet electric valve 3, an inlet pressure gauge 4, a pressure tank 5 and the outlet electric valve 6 connected sequentially. The outlet electric valve 6 is connected to the nanofiltration unit. The backwashable filter cartridge is arranged in the pressure tank 5. An outlet pressure gauge may be arranged between the pressure tank 5 and the outlet electric valve 6. A pressure difference between a water inflow side and the water outflow side of the backwashable filter cartridge can be estimated via through the inlet pressure gauge and the outlet pressure gauge. The PLC control system collects the pressure difference and makes a control. An increase of the pressure difference indicates the backwashable filter membrane 52 is seriously polluted and needs to clean.

In some embodiments, as shown in FIG. 1, the nanofiltration unit includes a water tank 7, a water feed pump 8, a booster pump 9, an inlet electric valve 10, an inlet electrical conductivity meter 11, an inlet pressure gauge 12, a pressure tank 13, the outlet electric valve 14, an outlet electrical conductivity meter 15, an outlet pressure gauge 16 and a water tank 17 connected sequentially. The water tank 7 is connected to the backwashable pre-filtration unit. and the nanofiltration filter cartridge is arranged in the pressure tank 13. A pressure difference of the water inflow side and a water outflow side of the nanofiltration filter cartridge can be estimated via the inlet pressure gauge 12 and the outlet pressure gauge 16. The PLC control system collects the pressure difference and makes a control. An increase of the pressure difference indicates the nanofiltration membrane 52 is seriously polluted and needs to clean. An electrical conductivity can be estimated by the inlet electrical conductivity meter 11 and the outlet electrical conductivity meter 15. An increase of an electrical conductivity at the water outflow side of the nanofiltration filter cartridge indicates the nanofiltration membrane 132 may be damaged and needs to maintain and repair.

In some embodiments, as shown in FIG. 1, the backwashing unit includes a water feed pump 18, an inlet electric valve 19, a first water inlet valve 21 for backwashing and a second water inlet valve 22 for forward washing. The inlet electric valve 19 is connected to the water outflow side and the water inflow side of the backwashable filter cartridge via the first water inlet valve 21 and the second water inlet valve 22, respectively. The backwashable pre-filtration unit is provided with a first drain valve 26 and a second drain valve 32. The first drain valve 26 and the second drain valve 32 are connected to the water outflow side and the water inflow side of the backwashable filter cartridge. The inlet electric valve 19 is connected to the water inflow side of the nanofiltration filter cartridge via a third water inlet valve 20 for forward washing. The nanofiltration unit is provided with a third drain valve 33 connecting to the water inflow side of the nanofiltration filter cartridge.

The water feed pump 18 may be connected to the water tank 7, and supplies water for backwashing to the water outflow side of the backwashable filter cartridge through the first water inlet valve 21 to clean the backwashable filter membrane 52, and then the sewage is discharged through the second drain valve 32. Water for forward washing water may also be provided to the water inflow side of the backwashable filter cartridge through the second water inlet valve 22 to clean the backwashable filter membrane 52, and then the sewage is discharged through the first drain valve 26. The water feed pump 18 may also be used to clean the nanofiltration filter cartridge through supplying washing water to the nanofiltration filter cartridge through the third water inlet valve 20 to clean the nanofiltration membrane 132, and then the sewage is discharged through the third drain valve 33.

In some embodiments, as shown in FIG. 1, the backwashing unit further includes an air compressor 34 and an air inlet valve 35. The air compressor 34 is connected to the water inflow side or the water outflow side of the backwashable filter cartridge via the air inlet valve 35. The backwashable filter cartridge can also be backwashed with air provided by the air compressor 34, combining with the water washing of the backwashable filter membrane 52 provided by the water feed pump 18 to further enhance the cleaning effect and ensure the filtration effect and efficiency of the backwashable filter membrane 52.

In some embodiments, as shown in FIG. 1, the backwashing unit further includes a chemical cleaning tank 23, a first chemical feed pump 24 and a first chemical inlet valve 25 connected sequentially. The first chemical inlet valve 25 is connected to the water outflow side or the water inflow side of the backwashable filter cartridge. Chemical cleaning is used to recover membrane flux, so as to completed remove a pollutant attached to the backwashable filter membrane 52. Chemical for cleaning is citric acid or sodium hydroxide.

In some embodiments, as shown in FIG. 1, the drinking water purification system further includes a chemical cleaning unit for chemical cleaning. The chemical cleaning unit includes a second chemical feed pump 27 and a second chemical inlet valve 28. The second chemical feed pump 27 and the second chemical inlet valve 28 are sequentially connected to the chemical cleaning tank 23. The second chemical inlet valve 28 is connected to the water inflow side of the nanofiltration filter cartridge, such that a pollutant attached to the nanofiltration membrane 132 is completely removed.

In some embodiments, as shown in FIG. 1, the drinking water purification system further includes a chemical feed unit, which includes a chemical feed tank 29, a chemical feed pump 30 and a chemical inlet valve 31 connected sequentially. The chemical inlet valve 31 is connected to the water inflow side of the nanofiltration filter cartridge. The nanofiltration membrane 132 is prone to degradation after oxidation, and thus a reducing agent is required to add on a water inflow side of the nanofiltration membrane 132. In addition, it is also necessary to add a scale inhibitor to a water outflow side of the nanofiltration membrane 132 to prevent scale formation. The reducing agent may be a sodium hydrogen sulfite. The scale inhibitor may be a natural polymer scale inhibitor or a synthetic polymer scale inhibitor.

The specific working process of the drinking water purification system provided herein is described as follows.

The water feed pump 2 pumps raw water in the water tank 1 into the pressure tank 5 through the inlet electric valve 3. The raw water is filtered via the backwashable filter membrane 52. The pressure difference between the water inflow side and the water outflow side of the backwashable filter cartridge can be estimated via the inlet pressure gauge and the outlet pressure gauge. The PLC control system collects the pressure difference and makes a control. An increase of the pressure difference indicates the backwashable filter membrane 52 is seriously polluted and needs to clean. The first water inlet valve 21 can supply water to the backwashable filter cartridge from the water outflow side of the backwashable filter cartridge. The second water inlet valve 22 can supply water to the backwashable filter cartridge from the water inflow side of the backwashable filter cartridge. A chemical agent is added to the water outflow side of the backwashable filter cartridge through the chemical cleaning tank 23 and the first chemical feed pump 24, so as to clean the backwashable filter membrane 52. The raw water enters the water tank 7.

The raw water in the water tank 7 is then pumped into the pressure tank 13 through the water feed pump 8 and the booster pump 9, and is filtered by the nanofiltration membrane 132. A pressure difference of the water inflow side and the water outflow side of the nanofiltration filter cartridge can be estimated via the inlet pressure gauge 12 and the outlet pressure gauge 16. The PLC control system collects the pressure difference and makes a control. An increase of the pressure difference indicates the nanofiltration membrane 52 is seriously polluted and needs to clean. The second chemical inlet valve 28 is connected to the water inflow side of the nanofiltration filter cartridge to completely remove the pollutant attached on the nanofiltration membrane 132. An electrical conductivity can be estimated by the inlet electrical conductivity meter 11 and the outlet electrical conductivity meter 15. An increase of an electrical conductivity at the water outflow side of the nanofiltration filter cartridge indicates the nanofiltration membrane 132 may be damaged and needs to maintain and repair.

Finally, the raw water is filtered by the pressure tank 13 and discharged to the water tank 17.

It should be noted that relational terms such as "first" and "second" are used to distinguish one element from another, and do not require or imply any such actual relationship or order between these elements; terms such as "include", "comprise" or any other variants thereof are non-exclusive, and a process, a method, an article, or equipment that includes a series of elements includes not only those elements, but also other elements that are not explicitly listed, or includes elements inherent to the process, the method, the article or the equipment; and unless otherwise specified, an element defined by "include a" is not intended to limit the number of this element, and one or more of the elements may be included in the process, the method, the article or the equipment.

Described above are merely preferred embodiments of the disclosure, which are not intended to limit the present disclosure. Obviously, modifications and replacements made by those skilled in the art without departing from the spirit of this disclosure should fall within the scope of the present disclosure defined by the appended claims.

What is claimed is:

1. A drinking water purification system, comprising:
a backwashable pre-filtration unit;
a nanofiltration unit; and
a backwashing unit;
wherein the backwashable pre-filtration unit is provided with a backwashable filter cartridge; the nanofiltration unit is provided with a nanofiltration filter cartridge; a water outflow side of the backwashable filter cartridge is connected to a water inflow side of the nanofiltration filter cartridge; and the backwashing unit is connected to the water outflow side of the backwashable filter cartridge; and
wherein the backwashing unit comprises a first water feed pump, a first inlet electric valve, a first water inlet valve for backwashing and a second water inlet valve for forward washing;
wherein the first inlet electric valve is connected to the water outflow side of the backwashable filter cartridge and a water inflow side of the backwashable filter cartridge via the first water inlet valve and the second water inlet valve, respectively;
the backwashable pre-filtration unit is provided with a first drain valve and a second drain valve; the first drain valve and the second drain valve are connected to the water outflow side and the water inflow side of the backwashable filter cartridge;
the first inlet electric valve is connected to the water inflow side of the nanofiltration filter cartridge via a third water inlet valve for forward washing; and the nanofiltration unit is provided with a third drain valve connecting to the water inflow side of the nanofiltration filter cartridge.

2. The drinking water purification system of claim 1, wherein the backwashable filter cartridge comprises a filter cylinder and a backwashable filter membrane; the filter cylinder is provided with a through hole; and the backwashable filter membrane is provided around an outer circumference of the filter cylinder in a pleated form.

3. The drinking water purification system of claim 1, wherein the nanofiltration filter cartridge comprises a filter cylinder and a nanofiltration membrane; the filter cylinder is provided with a through hole; and the nanofiltration membrane is provided around an outer circumference of the filter cylinder.

4. The drinking water purification system of claim 1, wherein the backwashable pre-filtration unit comprises a first water tank, a second water feed pump, a second inlet electric valve, an inlet pressure gauge, a pressure tank and an outlet electric valve connected sequentially; the outlet electric valve is connected to the nanofiltration unit; and the backwashable filter cartridge is arranged in the pressure tank.

5. The drinking water purification system of claim 1, wherein the nanofiltration unit comprises a second water tank, a third water feed pump, a booster pump, a third inlet electric valve, an inlet electrical conductivity meter, an inlet pressure gauge, a pressure tank, an outlet electric valve, an outlet electrical conductivity meter, an outlet pressure gauge and a third water tank connected sequentially; the second water tank is connected to the backwashable pre-filtration unit; and the nanofiltration filter cartridge is arranged in the pressure tank.

6. The drinking water purification system of claim 1, wherein the backwashing unit further comprises an air compressor and an air inlet valve; and the air compressor is connected to the water inflow side of the backwashable filter cartridge or the water outflow side of the backwashable filter cartridge via the air inlet valve.

7. The drinking water purification system of claim 1, wherein the backwashing unit further comprises a chemical cleaning tank, a first chemical feed pump and a first chemical inlet valve connected sequentially; and the first chemical inlet valve is connected to the water outflow side of the backwashable filter cartridge or the water inflow side of the backwashable filter cartridge.

8. The drinking water purification system of claim 7, wherein the drinking water purification system further comprises a chemical cleaning unit; the chemical cleaning unit comprises a second chemical feed pump and a second chemical inlet valve; the second chemical feed pump and the second chemical inlet valve are sequentially connected to the chemical cleaning tank; and the second chemical inlet valve is connected to the water inflow side of the nanofiltration filter cartridge.

9. The drinking water purification system of claim 1, wherein the drinking water purification system further comprises a chemical feed unit; the chemical feed unit comprises a chemical feed tank, a chemical feed pump and a chemical inlet valve connected sequentially; and the chemical inlet valve is connected to the water inflow side of the nanofiltration filter cartridge.

* * * * *